United States Patent [19]

Latall

[11] 3,715,484

[45] Feb. 6, 1973

[54] DUCT SCANNING APPARATUS
[75] Inventor: Roy C. Latall, Des Plaines, Ill.
[73] Assignee: Conco Inc.
[22] Filed: Feb. 11, 1971
[21] Appl. No.: 114,606

[52] U.S. Cl..........178/6.8, 178/DIG. 1, 178/DIG. 38
[51] Int. Cl...........................H04n 5/26, H04n 7/10
[58] Field of Search............178/DIG. 1, DIG. 38, 6.8

[56] References Cited

UNITED STATES PATENTS 3,168,909  2/1965  Zurbrigen et al.................178/DIG. 1
2,971,259  2/1961  Hahnau et al. ..................178/DIG. 1

Primary Examiner—Howard W. Britton
Attorney—Hofgren, Wegner, Allen, Stellman & McCord

[57] ABSTRACT

A duct scanning apparatus such as for use in determining leaks in a sewer pipe or the like wherein means are provided for progressively picturing the length of the inside of the duct. The picturing means may include a television vidicon pickup tube mounted within a tubular housing. The housing is preselected to be smaller in diameter than the inside of the sewer duct and means are provided for slidably carrying the housing on the duct wall so as to dispose the axis of the housing substantially below the axis of the duct. The apparatus further includes illuminating means carried on the housing for illuminating the portion of the interior of the sewer duct being pictured.

9 Claims, 3 Drawing Figures

PATENTED FEB 6 1973
3,715,484
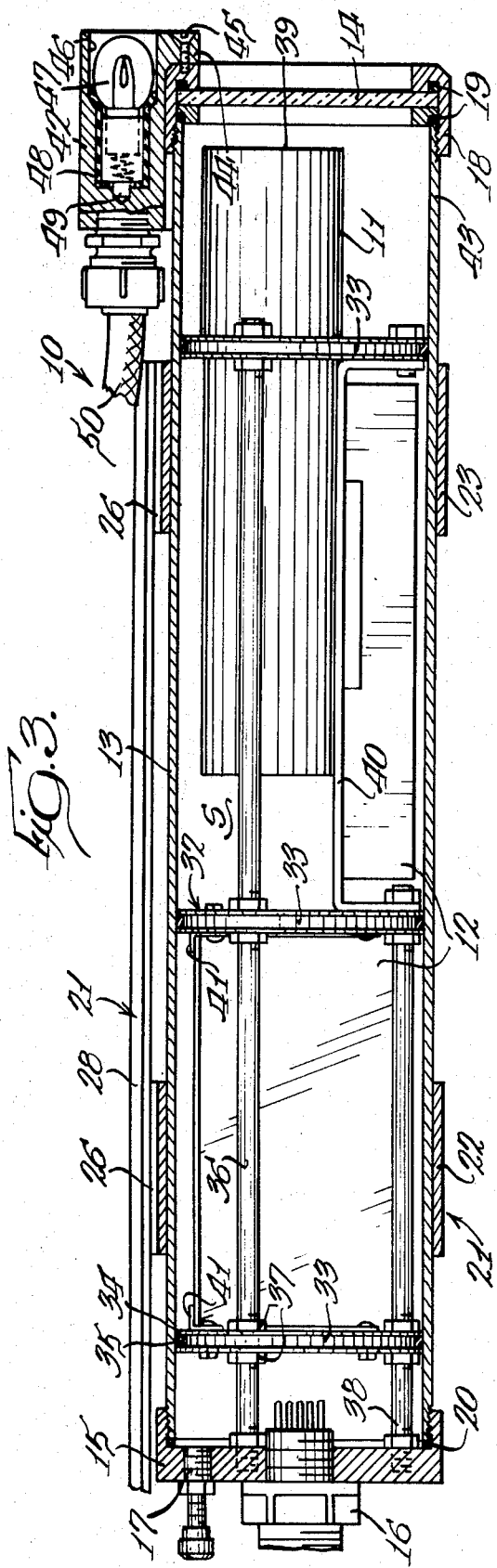
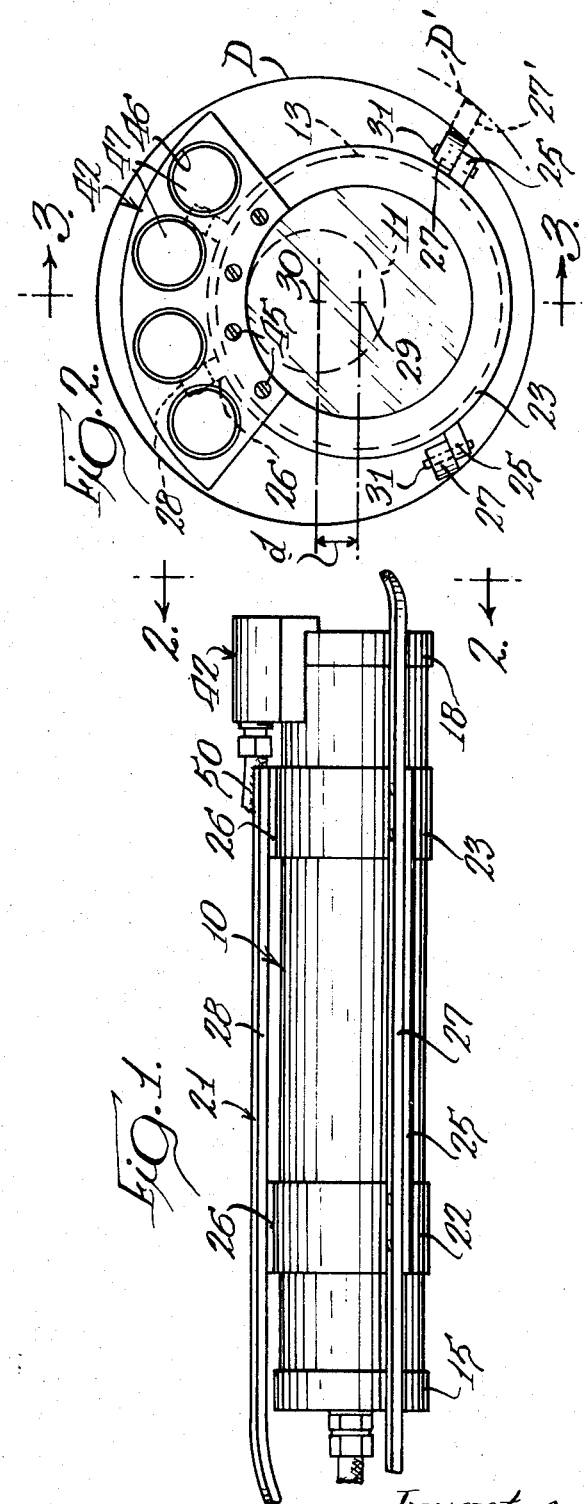
Inventor:
Roy C. Latall
By Hofgren, Wegner,
Allen, Stellman & McCord
Attys

DUCT SCANNING APPARATUS

BACKGROUND OF THE INVENTION

1. Field of the Invention

This invention relates to duct scanning devices and in particular to such devices adapted for locating leaks in a sewer duct.

2. Description of the Prior Art

In one form of sewer scanning device provided for locating leaks along the length of the sewer, a television camera is mounted in a tubular housing for picturing the interior of the sewer. Means are provided for illuminating the portion of the sewer to be pictured and means, such as a cable, are provided for transmitting the picture to a receiver for use by the operator in determining the location of leaks in the sewer. The apparatus is moved longitudinally through the sewer by means permitting accurate determination of the location of the leaks, with the apparatus normally being mounted on suitable slide members to permit such movement by hauling the apparatus slidably along the interior of the sewer.

It has been found that in such conventional sewer leak detecting devices, the scanning apparatus may at times tend to climb up the wall of the interior of the sewer which may result in an overturning of the apparatus. Such overturning is, obviously, highly undesirable as substantial damage may be done to the electronic components and illuminating means of the apparatus as well as presenting a serious problem of withdrawal of the overturned apparatus and reinstallation thereof in the sewer.

Another problem present in conventional sewer leak detector devices of this type is the relatively high voltage of the illuminating means provided for effecting suitable illumination of the sewer pipe. It is desirable in such systems to minimize the voltage because of the damp conditions in the sewer pipe to maintain necessary standards of safety.

Still another problem found in the known sewer leak detector devices is the failure of the electronic components due to vibration and shock resulting from movement of the device along the sewer where substantial irregularities may be present.

SUMMARY OF THE INVENTION

The present invention comprehends an improved apparatus for picturing the length of the inside of a tubular duct such as a sewer pipe eliminating the disadvantages of the above discussed conventional devices of the art.

More specifically, the present invention comprehends an improved apparatus for progressively picturing the length of the inside of a tubular duct defining a longitudinal duct axis, including a tubular housing having an outer diameter substantially less than the inside diameter of the duct and defining a longitudinal housing axis, slide means carried by the housing for supporting the housing in the duct with the housing axis parallel to and spaced below the duct axis, means carried by the housing for picturing the inside of the duct from a position centered on the duct axis, and means for progressively axially moving the housing through the duct, the center of gravity of the apparatus being spaced below the duct axis thereby effectively minimizing climbing of the duct by the apparatus during such axial movement. Thus, the apparatus of the present invention effectively avoids overturning of the scanning means in a novel and simple manner.

The invention further comprehends the provision of an illuminating means preselected to operate at a voltage similar to that of the electronic circuit and television vidicon pickup tube means which is preferably less than approximately 14 volts. Thus, the invention effectively maximizes safety conditions in the use thereof in such damp environments as leaky sewer pipes.

Still further, the invention comprehends the provision of improved means for mounting the vidicon pickup tube and electronic circuitry within the housing of the apparatus against vibration and shock. More specifically, the invention comprehends providing such apparatus for progressively picturing the length of the inside of a tubular duct, a tubular housing, means in the housing for picturing the inside of the duct including a vidicon pickup television tube and electronic circuitry, and support means in the housing carrying the television tube and electronic circuitry, the support means including a rigid carrier having a peripheral portion corresponding to the inside configuration of the housing, and an elongated, resilient element encircling the peripheral portion and providing a resilient mounting of the peripheral portion and providing a resilient mounting of the carrier, television tube and electronic circuitry in the housing. In the specific embodiment of the disclosure, the resilient element comprises an O-ring.

BRIEF DESCRIPTION OF THE DRAWING

Other features and advantages of the invention will be apparent from the following description taken in connection with the accompanying drawing herein:

FIG. 1 is a side elevation of a scanning device embodying the invention;

FIG. 2 is an enlarged end elevation thereof looking substantially from the line 2—2 of FIG. 1; and FIG. 3 is a diametric section thereof taken substantially along the line 3—3 of FIG. 2.

DESCRIPTION OF THE PREFERRED EMBODIMENT

In the exemplary embodiment of the invention as disclosed in the drawing, an apparatus generally designated 10 for progressively picturing the length of the inside of a tubular duct D, such as a sewer pipe, is shown to comprise a scanning device which is adapted to be hauled longitudinally through the interior of the sewer pipe while providing a picture on the inside of the duct for presentation to a user above ground. In the illustrated embodiment, the scanning device includes a television vidicon pickup tube 11 and associated control circuitry 12 carried within a rigid tubular housing 13. One end of the housing is closed by a transparent plate 14 defining a window through which the interior of the sewer duct may be scanned by the vidicon tube 11. The other end of the duct is closed by a cap 15 which carries suitable electrical connectors 16 and a capped air valve 17. The plate 14 is sealingly secured to the front end of the duct 13 by a suitable connecting ring 18 and O-ring seals 19, and cap 15 is sealed to the rear end of duct 13 by a suitable O-ring 20 to sealingly close the space S within housing 13 thereby maintaining the electronic elements against exposure to the damp conditions within the sewer duct.

Housing 13 is carried within a sled generally designated 21 including a pair of sleeves 22 and 23 encircling the housing 13 adjacent the opposite ends thereof. (The sleeves are rigidly connected by suitable sleeve bars 25 defining mounting lugs 25 at the bottom of housing 13, and mounting lugs 26 are provided at the top of the housing for removably carrying respectively lower elongated sled rails 27 and upper elongated sled rails 28.) As illustrated in FIG. 2, sled rails 27 are preselected to dispose the longitudinal axis 29 of the tubular housing 13 substantially below the longitudinal axis 30 of the sewer duct D. As apparatus 10 is adapted for use with ducts D of different diameters, suitable different width rails 27 may be selectively mounted to the housing by means of lugs 25 and securing means 31 to position axis 29 the preselected distance $d$ below axis 30 of any one of the different sized ducts D.

Thus, as best seen in FIG. 2, the housing 13 is effectively mounted in a lower portion of the sewer duct D so as to maintain the center of gravity of the scanning device 10 below the duct axis thereby effectively minimizing tendency of the device to climb upwardly along the wall of the sewer duct during longitudinal movement of the device through the sewer duct.

Illustratively, where the duct diameter is increased to the size of the broken line duct D', a wide sled rail 27' may be provided to maintain the desired spacing of axis 29 below axis 30 in the enlarge duct, as shown in FIG. 2.

Vidicon tube 11 and control circuitry 12 are carried in space S of housing 13 by a suitable carrier means generally designated 32. Carriers means 32 includes a plurality of discs 33 each having a circular peripheral portion 34 defining a radially outwardly opening groove receiving an elongated resilient element 35 for resiliently supporting the carrier means 32 in housing 13. Elements 35 may comprise conventional O-rings. The carrier further includes a plurality of connecting rods 36 secured to the respective discs 33 by suitable nuts 37 and threadedly connected at end 38 to cap 15. Vidicon tube 11 extends through a circular opening in the front disc 33 to have its front lens end 39 disposed closely rearwardly of transparent plate 14. The control circuitry 12 is mounted to the discs 33 by suitable brackets, such as brackets 40, and 41, whereby the electronic apparatus within space S is effectively resiliently mounted against transmission of shocks and vibrations which may occur in the movement of the apparatus along the sewer duct by virtue of irregularities therein.

As indicated briefly above, the interior of the sewer duct is suitably illuminated to permit picturing thereof by the vidicon tube 11. The present invention comprehends an illuminating means generally designated 42 carried on housing 13 at the rear end 43 thereof. The illuminating means includes a housing 44 secured to the connecting ring 18 by suitable means such as screws 45 to project rearwardly from the rearward end 43 of the housing. The lamp housing 44 is provided with a plurality of recesses 46 each adapted to receive a low voltage lamp 47. Each recess is provided with a socket 48 and center electrode 49 suitably connected to a power supply lead 50 to effect electrical energization of the lamp as desired. In the illustrated embodiment, lamps 47 are preselected to operate on the same direct current voltage as the electronic equipment in housing 13 and illustratively, may be arranged to operate at a voltage under 14 volts, and more specifically, at 12.6 volts. Thus, maximized safety in the use of the apparatus 10 is obtained notwithstanding the damp conditions obtaining in ducts such as leaky sewer ducts.

As best seen in FIG. 2, vidicon tube 11 is mounted in disc 33 so as to have axis thereof coincident with the longitudinal axis 30 of the duct D thereby providing a centered picturing of the duct interior for facilitated use such as in locating leaks in the duct. As the spacing $d$ is maintained with each of different diameter ducts D by virtue of the substitution of the corresponding suitable sled rails 27, the vidicon tube is centered relative to any of said ducts in which the apparatus is employed. As the diameter of housing 13 is substantially smaller than the diameter of the smallest duct with which the apparatus is to be employed, a substantial spacing is provided above the housing 13 to accommodate illuminating means 42, as seen in FIG. 2.

The use of apparatus 10 is extremely simple. The user disposes apparatus 10 at one end of the sewer duct to be scanned with the viewing window 14 rearwardmost. The apparatus is then slowly drawn along the length of the sewer duct with the sled rails sliding on the lower portion of the sewer duct. As discussed above, by virtue of the low center of gravity of the apparatus, the apparatus effectively remains at the bottom of the circular configuration of the duct interior avoiding climbing of the sidewall of the duct as may occur in conventional scanning devices of this type. As the apparatus is drawn through the duct, the interior of the duct is pictured by the pickup tube 11 and associated circuitry 12 with the picture being delivered to a suitable display receiver (not shown) accessible to the user above ground. The portion of the interior of the sewer duct being pictured is brightly illuminated by the illuminating means 42 so as to provide a clear indication of leaks and the like as the apparatus is moved through the duct. As the pickup tube 11 is accurately centered relative to the longitudinal axis of the sewer duct, a clear centered picture of the interior of the duct is presented to the user for facilitated location of leaks and the like. Further, as the electronic elements of the apparatus are resiliently supported by the O-ring carried support means, long trouble-free life of the apparatus is obtained notwithstanding the high incidence of shock and vibrations in the use thereof in such leak detecting operations.

The foregoing disclosure of specific embodiments is illustrative of the broad inventive concepts comprehended by the invention.

I claim:

1. Apparatus for progressively picturing the length of the inside of a tubular duct defining a longitudinal duct axis, comprising: a tubular housing having an outer diameter substantially less than the inside diameter of said duct and defining a longitudinal housing axis; slide means carried by the housing for supporting the housing in the duct with said housing axis parallel to and spaced below said duct axis; electronic means carried by said housing for picturing the inside of said duct from a position centered on said duct axis; support means in said housing carrying said electronic picturing means and defining a circular periphery and O-ring means concentrically carried on said periphery for resiliently supporting said electronic picturing means in said housing; and means for progressively axially moving said housing through said duct, the center of gravity of said apparatus being spaced below said duct axis thereby effectively minimizing climbing of said duct by said apparatus during such axial movement.

2. The duct picturing apparatus of claim 1 further including illuminating means extending upwardly from said housing to closely adjacent the upper portion of said duct for illuminating the portion of the inside of said duct being pictured by said picturing means.

3. The duct picturing apparatus of claim 2 including means for operating said illuminating means and electronic means at the same power supply voltage.

4. The duct picturing apparatus of claim 3 wherein said voltage is less than approximately 14 volts.

5. The duct picturing apparatus of claim 1 wherein said slide means comprises means of said housing for selectively mounting any one of a plurality of different size slide members corresponding to different size ducts for centering said picturing means position selectively at the axis of each of said different size ducts.

6. The duct picturing apparatus of claim 1 wherein said support means includes a plurality of rigid carriers each having a peripheral portion corresponding to the inside configuration of said housing, and an elongated, resilient element encircling said peripheral portion and providing a resilient mounting of said electronic means in said housing.

7. The picturing apparatus of claim 6 wherein said support means includes a plurality of such resilient mounting elements spaced axially in said housing and means rigidly connecting said carriers.

8. The picturing apparatus of claim 6 wherein said support means is arranged to carry said electronic circuitry in a lower portion of said housing.

9. The picturing apparatus of claim 6 wherein said resilient element comprises an O-ring.

* * * * *